US008133966B2

(12) United States Patent
Haubs et al.

(10) Patent No.: US 8,133,966 B2
(45) Date of Patent: Mar. 13, 2012

(54) OXYMETHYLENE COPOLYMERS AND THE USE THEREOF AND PROCESS FOR THE PREPARATION OF OXYMETHYLENE COPOLYMERS

(75) Inventors: Michael Haubs, Bad Kreuznach (DE); Michael Hoffmockel, Niedernhausen (DE); Jürgen Lingnau, Mainz-Laubenheim (DE); Robert Gronner, Erlanger, KY (US); Michael Gene Yearwood, Bishop, TX (US)

(73) Assignee: Ticona GmbH, Kelsterbach (DE)

( * ) Notice: Subject to any disclaimer, the term of this patent is extended or adjusted under 35 U.S.C. 154(b) by 339 days.

(21) Appl. No.: 12/423,625

(22) Filed: Apr. 14, 2009

(65) Prior Publication Data

US 2009/0270572 A1  Oct. 29, 2009

Related U.S. Application Data

(60) Provisional application No. 61/045,316, filed on Apr. 16, 2008.

(30) Foreign Application Priority Data

Apr. 16, 2008 (DE) .................. 10 2008 018 965

(51) Int. Cl.
*C08G 12/00* (2006.01)

(52) U.S. Cl. ........ 528/230; 528/365; 528/425; 528/232; 528/245; 564/505; 564/624; 564/623; 525/154; 525/184; 525/187; 526/266; 526/315; 526/333

(58) Field of Classification Search .................. 528/230, 528/365, 425, 232, 245; 564/505; 568/624, 568/623; 525/186, 154, 187; 526/266, 315, 526/333
See application file for complete search history.

(56) References Cited

U.S. PATENT DOCUMENTS

| | | | |
|---|---|---|---|
| 3,161,616 A | 12/1964 | Brown et al. | |
| 3,269,988 A | 8/1966 | Braude et al. | |
| 3,393,179 A | 7/1968 | Leverett et al. | |
| 3,998,791 A | 12/1976 | Radici et al. | |
| 4,097,453 A | 6/1978 | Radici et al. | |
| 4,431,794 A | 2/1984 | Sadlowski et al. | |
| 4,493,751 A | 1/1985 | Cherdron et al. | |
| 4,517,319 A | 5/1985 | Reske et al. | |
| 5,039,741 A | 8/1991 | Burg et al. | |
| 5,144,005 A | 9/1992 | Sextro et al. | |
| 5,183,860 A | 2/1993 | Kashihara | |
| 5,541,284 A | 7/1996 | Arnoldi et al. | |
| 5,959,036 A * | 9/1999 | Yahiro et al. .................. | 525/186 |
| 6,388,049 B1 | 5/2002 | Yokoyama et al. | |
| 2006/0235119 A1 | 10/2006 | Schmalz et al. | |
| 2008/0214748 A1 | 9/2008 | Assmann et al. | |

FOREIGN PATENT DOCUMENTS

| | | |
|---|---|---|
| DE | 1 158 709 | 12/1963 |
| DE | 1 445 255 | 11/1968 |
| DE | 2 263 300 A1 | 7/1974 |
| DE | 26 20 017 A1 | 11/1977 |
| DE | 2947490 A | 6/1981 |
| DE | 31 47 309 A1 | 6/1983 |
| DE | 37 03 790 A1 | 8/1988 |
| DE | 44 36 107 A1 | 4/1996 |
| DE | 195 81 345 C2 | 12/1996 |
| EP | 0 000 765 A1 | 2/1979 |
| EP | 0 080 656 A | 6/1983 |
| EP | 0 108 324 A | 5/1984 |
| EP | 0 115846 A2 | 8/1984 |
| EP | 0 137 305 A2 | 4/1985 |
| EP | 0 156285 A2 | 10/1985 |
| EP | 0 397492 A2 | 11/1990 |
| EP | 0 397493 A2 | 11/1990 |
| EP | 0 397494 A2 | 11/1990 |
| EP | 0 398585 A2 | 11/1990 |
| EP | 0 400827 A2 | 12/1990 |
| EP | 0 504 405 A1 | 9/1992 |
| EP | 0 673955 A2 | 9/1995 |
| EP | 0 716 105 A2 | 6/1996 |
| EP | 0 999224 A | 5/2000 |
| GB | 1 524 440 A | 9/1978 |
| GB | 1524410 A | 9/1978 |
| JP | 4/114003 A | 4/1992 |
| JP | 4/145114 | 5/1992 |
| JP | 5/59255 A | 3/1993 |
| JP | 2003-147161 | 5/2003 |
| JP | 2004-204051 | 7/2004 |

(Continued)

OTHER PUBLICATIONS

Product Data Sheets for Lucel grades N109-02, N109-LD, N109-WR, 1 page, 2004.
"Impact Modification of Polyacetal by Thermoplastic Elastomer Polyurethane", Mehrabzadeh, M.; Rezaie, D.; Journal of Applied Polymer Science, 2002, p, 2573-2582.
Penczek, et al., Cationic Ring-Opening Polymerization, p. 122, 1995.
International Search Report for PCT/EP2009/002712 Dated Aug. 3, 2009.
International Search Report for PCT/EP2009/002713 Dated Aug. 3, 2009.

*Primary Examiner* — Randy Gulakowski
*Assistant Examiner* — Shane Fang
(74) *Attorney, Agent, or Firm* — Dority & Manning, P.A.

(57) ABSTRACT

Oxymethylene copolymers having a high proportion of terminal alkyl ether groups and having terminal hydroxyalkylene groups are described. These polymers are distinguished by high thermal stability and high hot water resistance. Furthermore, a process for the preparation of oxymethylene copolymers is described in which the polymerization of at least one monomer forming —$CH_2$—O— units is effected in the presence of at least one acetal of formaldehyde and of at least one initiator of cationic polymerization and the initiator of cationic polymerization is used in an amount of less than or equal to $10^{-4}$ mol %, based on the amount of the monomers present at the beginning of the polymerization and forming —$CH_2$—O— units, in which starting materials of the polymerization are used such that the content of water and formic acid at the beginning of the polymerization is less than or equal to 40 ppm, and in which the initiator and/or the active polymer chains are deactivated by treatment of the prepared polymer with a base-containing protic solvent.

22 Claims, No Drawings

FOREIGN PATENT DOCUMENTS

| WO | WO 2004/065444 A1 | 8/2004 |
| WO | WO 2005/012380 A1 | 2/2005 |
| WO | WO 2006/050869 A1 | 5/2006 |
| WO | WO 2006/058679 A1 | 6/2006 |
| WO | WO 2006/089915 A1 | 8/2006 |
| WO | WO 2006/097486 A1 | 9/2006 |
| WO | WO 2006/105918 A1 | 10/2006 |
| WO | WO 2007/073873 A1 | 7/2007 |
| WO | WO 2007/073874 A1 | 7/2007 |

* cited by examiner

OXYMETHYLENE COPOLYMERS AND THE USE THEREOF AND PROCESS FOR THE PREPARATION OF OXYMETHYLENE COPOLYMERS

RELATED APPLICATIONS

The present application is based on and claims priority to U.S. Provisional Patent Application No. 61/045,316, filed on Apr. 16, 2008 and claims priority to or the benefit of German Patent Application No. 102008018965.0-44, filed on Apr. 16, 2008.

The present invention relates to novel oxymethylene copolymers with high thermal stability and hot water tolerance and the use thereof. Furthermore, the invention relates to a process for the preparation of oxymethylene copolymers.

The preparation of polyoxymethylenes ("POM") is known per se. For example, cyclic oligomers of formaldehyde, such as 1,3,5-trioxane ("trioxane") or tetraoxocane, are polymerized with the aid of cationic initiators. The polymerization can be effected both in the mass as precipitation polymerization and in the melt under pressure. After polymerization is complete, the active chain ends are deactivated by addition of basic compounds.

Different processes for deactivating reaction mixtures are already known. These may be divided into processes in which the polymer melt is treated with a basic deactivator and into processes in which the reaction mixture is dissolved in a solvent which contains a basic deactivator. Suitable solvents are, for example, protic compounds, such as methanol, or methanol/water mixtures.

It is furthermore known that chain cleavage occurs in the deactivation of the reaction mixture with protic compounds. As a result, both the molecular weight of the polymers produced is decreased and unstable hemiacetal chain ends are produced. In the case of oxymethylene homopolymers, this leads to complete degradation of such chains, since no oxyalkylene units having at least two carbon atoms are present in the polymer chain. In this description, the term oxyalkylene units having at least two carbon atoms is preferably to be understood as meaning units of the formula $-(CH_2)_m-O-$, in which m is an integer between 2 and 6.

Impurities in the monomers likewise reduce the molecular weight during the polymerization. Purified monomers are therefore used. The sum of the protic impurities, such as water and formic acid, is typically below 40 ppm.

Examples of the deactivation processes described above are described in DE-A-44 36 107, U.S. Pat. No. 3,269,988, EP-A-80,656 and GB-A-1,524,410.

JP-A-04/114,003 and JP-A-04/145,114 describe the deactivation of the polymerization catalyst in oxymethylene polymer mixtures by addition of mixtures of selected oxides and melting of the mixture.

It has already long been known that the stability of oxymethylene polymers can be increased by blocking the end groups, for example by introducing terminal ether or ester groups. Examples of this are to be found in DE-B-1,158,709, U.S. Pat. No. 3,998,791, U.S. Pat. No. 3,393,179, DE-A-1,445,255, DE-B-1,158,709, U.S. Pat. No. 4,097,453 and U.S. Pat. No. 3,161,616.

While oxymethylene polymers blocked with terminal ester groups are degraded at elevated temperatures or in basic environments, oxymethylene polymers blocked with terminal ether groups are distinguished by very high stability. However, the processes proposed to date for the preparation of these polymers comprise a separate step for blocking the polymers (cf. for example U.S. Pat. No. 3,161,616). However, these oxymethylene polymers contain no oxyalkylene units having at least two carbon atoms which adversely affects thermal and hydrolytic stability.

EP-A-504,405 also discloses oxymethylene polymers which, in addition to oxymethylene units, contain small proportions of oxyalkylene units having at least two carbon atoms, in particular of oxyethylene units, and which have a low content of terminal formyl groups. The proportion of the oxyalkylene units, based on the proportion of the oxymethylene units, is from 0.07 to 0.5 mol %. If the stated content of oxyalkylene units is not reached, polymers having insufficient heat stability and stability to hot water form. These polymers are prepared in the presence of a selected amount of a perfluoroalkylsulfonic acid (derivative) as a catalyst, and monomers having a low water and formic acid content or free of water and formic acid are used. The deactivation of the polymerization mixture is effected by addition of selected crystalline basic adsorbents, for example of oxides or of hydroxides of alkali metals or alkaline earth metals.

An object of the present invention is to provide selected oxymethylene copolymers which are distinguished by a very high thermal stability and stability with regard to bases.

A further object of the present invention is to provide a simple process for the preparation of oxymethylene copolymers.

It has now surprisingly been found that stable oxymethylene copolymers having a high molecular weight can be prepared by reacting monomers in the presence of at least one acetal of formaldehyde, followed by the deactivation with basic compounds in a protic solvent if very small amounts of protic acids are used as initiators and if starting materials having a low water content and low content of formic acid are used. Surprisingly, this results in polymers with high thermal stability and with high hot water resistance. This preferably results in polymers whose proportion of oxyalkylene groups is considerably beneath the limit given in EP-A-504,405.

The present invention relates to oxymethylene copolymers comprising oxymethylene units and oxyalkylene units having at least two carbon atoms and a proportion of terminal alkyl ether groups and of terminal hydroxyalkylene groups having at least two carbon atoms, the proportion of terminal alkyl ether groups, based on all terminal groups, being at least 80% and the proportion of terminal hydroxyalkylene groups having at least two carbon atoms, based on all terminal groups, being up to 20%.

Preferred oxymethylene copolymers comprise a proportion of oxyalkylene units having at least two carbon atoms, based on the proportion of the oxymethylene units, of between 0.001 mol % and 0.05 mol %, very particularly preferably between 0.01 mol % and 0.05 mol %.

The oxymethylene copolymers according to the invention are furthermore distinguished by zero or a very low content of terminal formyl groups. This is typically from 0.01 to 2% of all terminal groups. Oxymethylene copolymers having a content of terminal formyl groups of less than 1% of all terminal groups are preferred. In addition, other conventional terminal groups, for example terminal hemiacetal groups, may still, if appropriate, be present in very small amounts, for example in amounts of less than 1%.

Typical oxymethylene copolymers of the present invention are polymers of the formula I $$-(O-CH_2)_x-(O-C_mH_{2m})_y- \qquad (I)$$

which have terminal alkyl ether groups of the formula $-O-R^1$ and terminal hydroxyalkylene groups of the formula $-O-C_mH_{2m}-OH$ and, if appropriate, terminal groups of the formula $-O-R^2$, in which x is a positive integer, preferably from 10 to 10 000, particularly preferably from 300 and 10 000, m is an integer from 2 to 6, preferably 2, y is an integer from 0 to 10, the ratio $y_{ar}/x_{ar}$ is from 0.001 to 0.05

$y_{ar}$ being the arithmetic mean of all values y in the polymer mixture and $x_{ar}$ being the arithmetic mean of all values x in the polymer mixture, $R^1$ is a linear or branched alkyl group and $R^2$ is a formyl group —CHO, with the proviso that the proportion of terminal alkyl ether groups of the formula —O—$R^1$, based on all terminal groups, is at least 80%, and that the proportion of terminal hydroxyalkylene groups of the formula —O—$C_mH_{2m}$—OH, based on all terminal groups, is up to 20%.

$y_{ar}$ is the arithmetic mean of all values y in the polymer mixture and $x_{ar}$ is the arithmetic mean of all values x in the polymer mixture.

The mean value $x_{ar}$ is preferably from 50 to 5000.

$R^1$ and $R^2$ are preferably $C_1$-$C_6$-alkyl radicals, which are preferably straight-chain.

$R^1$ and $R^2$, independently of one another, are particularly preferably methyl or ethyl, in particular methyl.

The invention furthermore relates to a process for the preparation of the oxymethylene polymers described above, which comprises:

a) polymerization of least one monomer forming —$CH_2$—O— units and at least one monomer forming oxyalkylene units having at least two carbon atoms, in the presence of at least one acetal of formaldehyde, with at least one protic acid or one of its derivatives as an initiator, the concentration of the initiator being less than $10^{-4}$ mol %, based on the amount of monomers which are present at the beginning of the polymerization and form —$CH_2$—O— units, b) use of starting materials of the polymerization such that the content of water and formic acid at the beginning of the polymerization is less than or equal to 40 ppm, and c) deactivation of the initiator and/or of the active polymer chains by treatment of the prepared polymer with basic compounds in a protic solvent.

The invention also relates to the oxymethylene copolymers obtainable according to this process.

Step a) of the process according to the invention is a polymerization, known per se, of monomers forming —$CH_2$—O— units with at least one monomer forming oxyalkylene units having at least two carbon atoms and optionally further comonomers and/or branching agents. The polymerization can be effected homogeneously or preferably heterogeneously.

For this purpose, a monomer forming —$CH_2$—O— units and a monomer forming oxyalkylene units having at least two carbon atoms or a mixture of different monomers is reacted in a manner known per se with protic acids as an initiator of the cationic polymerization and with acetals of formaldehyde as regulator. The polymerization can be effected at atmospheric pressure or at moderate pressures up to 25 bar, for example at pressures of from 1 to 10 bar.

The polymerization temperature is preferably below the melting point of the resulting polymer.

Typical polymerization temperatures are in the range from 60 to 160° C., preferably from 70 to 140° C.

The molecular weights, characterized as melt volume flow rate MVR, of these polymers can be adjusted within wide ranges. Typical MVR values are from 0.1 to 100 g/10 min, preferably from 1 to 80 g/10 min, measured according to EN ISO 1133 at 190° C. at a load of 2.16 kg.

If desired, small amounts of branching agents may be used. Usually, the amount of branching agents is not more than 1% by weight, based on the total amount of monomers which is used for the preparation of the oxymethylene polymers, preferably not more than 0.3% by weight. Preferred branching agents are polyfunctional epoxides, glycidyl ethers or cyclic formals.

Preferred chain transfer agents (regulators) are compounds of the formula II

$$R^3—(O—CH_2)_q—O—R^4 \quad (II)$$

in which $R^3$ and $R^4$, independently of one another, are linear or branched alkyl radicals, in particular $C_1$-$C_6$-alkyl radicals, which are preferably straight-chain.

$R^3$ and $R^4$, independently of one another, are particularly preferably methyl, ethyl, propyl or butyl, in particular methyl.

Particularly preferred chain transfer agents are compounds of the formula II in which q is 1 or very particularly preferably methylal.

The chain transfer agents are usually used in amounts of up to 20 000 ppm, preferably from 100 to 5000 ppm, particularly preferably from 200 to 2000 ppm, based on the monomer mixture.

Suitable initiators are in particular strong protic acids, such as fluorinated or chlorinated alkane- and arylsulfonic acids, e.g. trifluoromethanesulfonic acid, or derivatives thereof, such as esters or anhydrides of protic acids, in particular trifluoromethanesulfonic anhydride or trifluoromethanesulfonic esters, such as the alkyl esters. Also suitable are perchloric acid and esters thereof and protic acids in the presence of salts thereof.

According to the invention, initiators are those compounds which, in concentrations of $<10^{-4}$ mol %, initiate the polymerization.

The initiators are used in very small amounts. In the process according to the invention, initiators are used in an amount of less than or equal to $10^{-4}$ mol %, preferably from $10^{-6}$ mol % to $10^{-4}$ mol %, based on the amount of the monomers which are present at the beginning of the polymerization and form —$CH_2$—O— units.

In the process according to the invention, purified starting materials are used in the polymerization, such that the content of water and formic acid during the polymerization is less than 100 ppm, preferably less than 40 ppm, based on the amount of monomers present at the beginning of the polymerization and forming —$CH_2$—O— units. The measures for purifying the starting materials are known to the person skilled in the art. The determination of the water and formic acid content in the monomers is effected by the conventional methods, i.e. water by Karl Fischer and formic acid by acid-based titration.

After polymerization, the solid or liquid polymerization mixture is dissolved according to point c) using a protic solvent which contains at least one base. As a result, the initiator and active polymer chains are deactivated. A thermal, controlled degradation of the unstable terminal groups takes place.

The dissolution is typically effected at temperatures from 130 to 200° C., preferably from 140 to 190° C.

All of these compounds which are capable of ending a cationic polymerization, for example compounds which undergo a basic reaction with water, can be used as the base. Bases which do not react with formaldehyde are preferred. Examples are tertiary amines, such as triethylamine, or secondary alkali metal phosphates, such as disodium hydrogen phosphate, or amides, such as dimethylformamide or dimethylacetamide, or aromatic amines, such as melamine.

Typical deactivation pressures are in the range from 1 to 50 bar, preferably from 2 to 30 bar, in particular from 3 to 20 bar.

The duration of the thermal treatment is from 10 seconds to 2 hours, preferably from 1 minute to 60 minutes, depending on the temperature. The treatment is preferably effected with substantial exclusion of oxygen.

The protic solvent used is preferably a mixture which contains water and methanol. The water concentration is from 2% by weight to 50% by weight, preferably from 5% by weight to 30% by weight. The methanol concentration is from 50 to 90% by weight, preferably from 70% by weight to 90% by weight.

After the deactivation and degradation of the unstable fractions in the above-described protic solvent which has been made basic, the polymer is precipitated. The precipitation can be effected, for example, by cooling the solution. The precipitation is followed by drying of the polymer. Mechanical and/or thermal methods can be used for drying. These methods are known to the person skilled in the art.

The polymer thus obtained can be stabilized and modified by the known additives and subsequently granulated.

The compounds usually used for stabilizing and/or modifying oxymethylene polymers can be used as components of the mixture of additives.

These are, for example, antioxidants, acid scavengers, formaldehyde scavengers, UV stabilizers or heat stabilizers. In addition, the mixture of additives may contain processing aids, for example adhesion promoters, lubricants, nucleating agents, demolding agents, fillers, reinforcing materials or antistatic agents and additives which impart a desired property to the molding material, such as dyes and/or pigments and/or impact modifiers and/or additives imparting electrical conductivity; and mixtures of these additives, without restricting the scope to said examples.

The oxymethylene copolymers thus obtained are distinguished by a good thermal stability, hot water resistance and low-temperature notched impact strength.

EXAMPLES

A POM polymer having 86% of terminal —OCH$_3$ groups, 13% of terminal hydroxyethylene groups, 0.025 mol % of oxyethylene groups, based on the content of oxymethylene groups, and a melt volume rate of 2.5 ml/10 min was stored for 8 weeks in water at 95° C. The weight loss of the test specimens was less than 1% by weight and the breaking strength remained unchanged at 70 MPa.

In comparison, the weight loss of a POM homopolymer having the same MVR but a proportion of 60-70% of terminal —OCH$_3$ groups, no terminal hydroxyethylene groups and no oxyethylene groups was 10% by weight and the breaking strength decreased after 8 weeks to below 40 MPa.

The invention claimed is:

1. An oxymethylene copolymer comprising oxymethylene units and oxyalkylene units having at least two carbon atoms, wherein the proportion of oxyalkylene units, based on the proportion of oxymethylene units, is between 0.001 mol % and 0.05 mole %, the copolymer further comprising a proportion of terminal alkyl ether groups and of terminal hydroxyalkylene groups having at least two carbon atoms, the proportion of terminal alkyl ether groups, based on all terminal groups, being at least 80% and the proportion of terminal hydroxyalkylene groups having at least two carbon atoms, based on all terminal groups, being up to 20%, wherein terminal hydroxyalkylene groups are present on the copolymer.

2. The oxymethylene copolymer as claimed in claim 1, wherein at least 90% of all terminal groups are terminal alkyl ether groups, and wherein up to 10% of all terminal groups are terminal hydroxyalkylene groups having at least two carbon atoms.

3. The oxymethylene copolymer as claimed in claim 1, wherein the proportion of oxyalkylene units, based on the proportion of the oxymethylene units, is from 0.01 to 0.05 mol %.

4. The oxymethylene copolymer as claimed in claim 1, which has the formula I $$-(O-CH_2)_x-(O-C_mH_{2m})_y- \qquad (I)$$

and has terminal alkyl ether groups of the formula —O—R$^1$ and terminal hydroxyalkylene groups of the formula —O—C$_m$H$_{2m}$—OH and, if appropriate, terminal groups of the formula —O—R$^2$, x is a positive integer, m is an integer from 2 to 6, y is an integer up to 10, the ratio y$_{ar}$/x$_{ar}$ is from 0.001 to 0.05 y$_{ar}$ being the arithmetic mean of all values y in the polymer mixture and x$_{ar}$ being the arithmetic mean of all values x in the polymer mixture, R$^1$ is a linear or branched alkyl group and R$^2$ is a formyl group —CHO, with the proviso that the proportion of the terminal alkyl ether groups of the formula —O—R$^1$, based on all terminal groups, is at least 80%, and that the proportion of the terminal hydroxyalkylene groups of the formula —O—C$_m$H$_{2m}$—OH, based on all terminal groups, is up to 20%.

5. The oxymethylene copolymer as claimed in claim 4, wherein the index x is an integer from 300 to 10 000.

6. A process for the preparation of oxymethylene copolymers as claimed in claim 1, comprising the measures:

a) polymerization of least one monomer forming —CH$_2$—O— units and at least one monomer forming oxyalkylene units having at least two carbon atoms, in the presence of at least one acetal of formaldehyde, with at least one protic acid or one of its derivatives as an initiator, the concentration of the initiator being less than 10$^{-4}$ mol %, based on the amount of monomers which are present at the beginning of the polymerization and form —CH$_2$—O— units, b) apply starting materials of the polymerization such that the content of water and formic acid at the beginning of the polymerization is less than or equal to 40 ppm, and c) deactivation of the initiator and/or of the active polymer chains by treatment of the prepared polymer with at least one basic compound in a protic solvent, the protic solvent being a mixture that contains water and alcohol.

7. The process for the preparation of oxymethylene copolymers as claimed in claim 6, wherein the polymerization of the monomer or monomers forming —CH$_2$—O— units and of the monomer or monomers forming at least oxyalkylene units having at least two carbon atoms is carried out as a heterogeneous polymerization, and wherein the deactivation of the initiator and/or of the active polymer chains is effected by dissolving the prepared polymer in the protic solvent containing the at least one basic compound.

8. The process as claimed in claim 6, wherein formaldehyde or trioxane is used as the monomer forming —CH$_2$—O— units.

9. The process as claimed in claim 6, wherein a compound of the formula II

 (II)

in which $R^3$ and $R^4$, independently of one another, are alkyl radicals, and q is an integer from 1 to 100, is used as the acetal of formaldehyde.

10. The process as claimed in claim 9, wherein a compound of the formula II in which q is 1, is used as the acetal of formaldehyde.

11. The process as claimed in claim 6, wherein strong protic acids are used as initiator of the cationic polymerization.

12. The process as claimed in claim 11, wherein perchloric acid or fluoroalkanesulfonic acid is used as the initiator of the cationic polymerization.

13. The process as claimed in claim 6, wherein the initiator of the cationic polymerization is present in the polymerization mixture in an amount of from $10^{-6}$ mol % to $10^{-4}$ mol %, based on the amount of the monomer present at the beginning of the polymerization and forming —$CH_2$—O— units.

14. The process as claimed in claim 6, wherein the oxymethylene polymer prepared is cooled after the polymerization and is milled to give a powder, and wherein the powder is dissolved in the base-containing protic solvent.

15. The process as claimed in claim 6, wherein the oxymethylene polymer prepared is dissolved directly after the polymerization as a hot precipitation polymer in the base-containing protic solvent.

16. The process as claimed in claim 6, wherein a mixture of water and is used as the protic solvent.

17. The process as claimed in claim 16, wherein a mixture of from 50 to 98% by weight of methanol and from 2 to 50% by weight of water is used as the protic solvent.

18. The process as claimed in claim 6, wherein the deactivation is effected at a pressure of from 1 to 50 bar.

19. A mold comprising the oxymethylene copolymers as claimed in claim 1.

20. The oxymethylene copolymer as claimed in claim 1, wherein the proportion of oxyalkylene units, based on the proportion of oxymethylene units, is between 0.001 mol % and 0.025 mol %.

21. The process as claimed in claim 17, wherein the mixture further comprises a tertiary amine.

22. The process as claimed in claim 21, wherein the tertiary amine is triethylamine.

* * * * *